(12) United States Patent
Mizuno

(10) Patent No.: US 6,440,597 B1
(45) Date of Patent: Aug. 27, 2002

(54) SEAL AND FUEL CELL WITH THE SEAL

(75) Inventor: Seiji Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/443,301

(22) Filed: Nov. 19, 1999

(30) Foreign Application Priority Data

Dec. 16, 1998 (JP) .......................................... 10-357649

(51) Int. Cl.$^7$ .............................................. H01M 08/10
(52) U.S. Cl. .......................................... 429/34; 429/35
(58) Field of Search ............................. 429/34, 35, 36, 429/30, 33

(56) References Cited

U.S. PATENT DOCUMENTS

| | | | |
|---|---|---|---|
| 3,907,602 A | * | 9/1975 | Sperandio et al. .......... 136/133 |
| 5,364,711 A | * | 11/1994 | Yamada et al. ................ 429/15 |
| 5,928,807 A | * | 7/1999 | Elias ........................... 429/35 |

FOREIGN PATENT DOCUMENTS

| | | |
|---|---|---|
| JP | 62-278760 | 12/1987 |
| JP | 6-215781 | 8/1994 |
| JP | 10-199551 | 7/1998 |

\* cited by examiner

*Primary Examiner*—Stephen Kalafut
*Assistant Examiner*—Raymond Alejandro
(74) *Attorney, Agent, or Firm*—Oliff & Berridge, PLC

(57) ABSTRACT

A seal in an electrochemical fuel cell prevents fluid in a space from leaking. The seal includes a first layer and a second layer having different coefficients of elasticity. The seal is made of rubber. An electrochemical fuel cell includes an electrolyte membrane, a first electrode on one side of the electrolyte membrane and a second electrode on another side of the electrolyte membrane, a first separator and a second separator, and the seal. The first and second separators sandwich the first and second electrodes. The seal is not only provided between the electrolyte membrane and one of the first and second separators for sealing a path of a fuel gas or an oxidative gas, but is also between the first and second separators for sealing a coolant path. Since the softer layer in the seal elastically deforms and absorbs a surface roughness of the electrolyte membrane or the electrode, the sealing ability of the seal is high. The seal can responds to and follows a length of the electrolyte membrane or the separator changed by varying temperature. Furthermore, since the harder layer supports the electrolyte membrane or the electrode, a high stiffness of the fuel cell stack can be obtained.

11 Claims, 6 Drawing Sheets

SEAL AND FUEL CELL WITH THE SEAL

FIELD OF THE INVENTION

The present invention relates to a seal and an electrochemical fuel cell including the seal. Especially, the seal in the electrochemical fuel cell prevents fluid which is provided in a space from leaking. Furthermore, the seal is provided in the electrochemical fuel cell for sealing a space between an electrolyte membrane and a separator or for sealing a coolant path between two separators.

BACKGROUND OF THE INVENTION

In an electrochemical fuel cell, uniting a generator part and a frame part as one body by a hot-press method is proposed, as a sealing method which seals a path shaped by an electrolyte membrane and a separator for a fuel gas containing hydrogen or an oxidative gas containing oxygen. Two electrodes sandwich the electrolyte membrane in the generator part, and an opening area of the frame is marginally smaller than one of the generator parts made of plastic. One of these examples is disclosed in Japanese Laid-Open Patent Application No. 10-199551. Moreover, in the above-mentioned method, the path shaped by the electrolyte membrane and the separator for the fuel gas or the oxidative gas is sealed by providing a seal such as an O-ring between the frame part and the separator.

As another method, a method in which the generator part and the separator are connected by using adhesives is also proposed. In this method, the adhesives function as a comparatively soft seal after the connection, and the adhesives seal the path for the fuel gas or the oxidative gas.

In the aforementioned methods, which unite the generator part and the frame part as one body and furthermore puts the seal between the frame and the separator, sealing ability on the sealing surface could not be secured, because a clearance between the frame and the separator varies by a thermal expansion caused by heat of the electrolyte membrane in the generator part.

Furthermore, in the above-mentioned method which uses the adhesives, when a fuel cell stack is assembled by stacking a plurality of the generators and the separators, a stiffness of the fuel cell stack is weakened by laminating sealing parts using adhesives. Consequently, the fuel cell stack can not have sufficient stiffness and rigidity.

SUMMARY OF THE INVENTION

It is thus one object of the present invention to solve the aforementioned problems. Another object of the invention is to provide a seal which can seal securely by following and responding to a varying length of an electrolyte membrane or a separator. Furthermore, an object of the invention is to provide a fuel cell stack which has a sufficient stiffness, when a plurality of electrolyte membranes, separators, etc. are stacked in laminated condition.

According to one aspect of the invention, a seal has at least two layers with different coefficients of elasticity. As the first embodiment of a seal in an electrochemical fuel cell, a seal includes a first layer and a second layer having different coefficients of elasticity, and the seal prevents fluid in a space from leaking. For example, the seal is made of rubber, and the rubber hardness of the harder layer is 60 degrees or higher and the softer layer is 60 degrees or lower.

Since the coefficients of elasticity of the layers in the seal are different, the seal can appropriately respond to two members which sandwich the seal, and the seal can seal sufficiently even if one of the two members or two members change its length or both lengths. Providing the layers with different coefficients of elasticity in series between the two members indicates that a softer layer and a harder layer are provided in the seal. Since the softer layer is provided in the seal, this softer layer can elastically deform by responding to the changing length of the one or two members. On the contrary, since the harder layer is provided in the seal, the other layer except the harder one changes the shape by elastic deformation, and the other layer can follow the changing length. The harder layer contributes to obtain a higher stiffness between the two members, because the harder layer has a higher resilience of elastic deformation. Consequently, the stiffness of the parts which uses the seal becomes higher, and an upper limit of the compression rate of the two members with the seal can be improved. At the same time, a high sealing performance of the seal can be obtained.

Incidentally, a seal containing three or more layers is also available, because above-mentioned results can be obtained by having at least two layers with different coefficients of elasticity.

When the softer layer is connected to one of the two members after the harder layer is connected to another member, the softer layer (that is, the lower coefficient of elasticity) absorbs a surface roughness of the one of the two members. Consequently, the higher sealing ability can be achieved.

The first embodiment of an electrochemical fuel cell is an electrochemical fuel cell including an electrolyte membrane, a first electrode on one side of the electrolyte membrane and a second electrode on another side of the electrolyte membrane, a first separator and a second separator sandwiching the first and second electrodes; and the above-mentioned seal between the electrolyte membrane and one of the first and second separators. The electrolyte membrane, two electrodes and two separators are stacked in the lamination condition. This electrochemical fuel cell has a good performance of a sealing ability, and a high stiffness of the fuel cell stack is obtained, because it provides the first embodiment seal for the seal. The total performance and reliability of the fuel cell, then, can be improved.

In this first embodiment of the fuel cell, it is also available that the layer with a higher coefficient of elasticity is positioned to face the electrolyte membrane and the layer with a lower coefficient of elasticity is positioned to face the separator. Since the layer having a lower coefficient of elasticity absorbs the surface roughness of the separator in this case, a higher sealing performance can be secured.

In the first embodiment of the fuel cell, the above-mentioned seal of the first embodiment of the seal can be provided for sealing a coolant path between the first separator and the second separator.

As the same reason of the first above-mentioned embodiment of the fuel cell including the seal, the first embodiment of the fuel cell including the seal for sealing the coolant path has a high sealing ability and a high stiffness of the fuel cell stack in the lamination direction. The performance and the reliability of the fuel cell can be improved.

As the second embodiment of a seal in an electrochemical fuel cell, a seal includes a base part and a seal part. The base part has a first surface, a second surface, and a third surface. The second and third surfaces are opposite to the first surface, and the third surface is closer to the first surface than the second surface. The seal part on the third surface of the base part extends beyond a plane defined by the second surface of the base part. The coefficient of elasticity of the base part is higher than the coefficient of elasticity of the seal part. For example, the seal is made of rubber, and the rubber hardness of the base part is 60 degrees or higher and the rubber hardness of the seal part is 60 degrees or lower.

In this second embodiment of the seal, since the seal part is comparatively soft, by the elastic deformation the seal part can follow the length of the members which sandwiches the seal, though the length changes due to a heat expansion. When the seal part is connected to one of the members after the base part is connected to another member, the seal part having the lower coefficient of elasticity absorbs a surface roughness of the one of the members. Consequently, the higher sealing ability can be He attained. Moreover, since the base part has a high resilience against deformation, the stiffness in the pressure direction can be improved. Especially, if the base and seal parts are made up so that the base part receives a pressure from the members when the seal receives an excessive pressure than a predetermined value, the higher stiffness in the pressure direction can be obtained.

The second embodiment of an electrochemical fuel cell is attained by providing the above-mentioned second embodiment of the seal as a seal to the same type of the fuel cell as the first embodiment. A high sealing ability and high stiffness of the fuel cell stack are obtained as the same as the first embodiment of the fuel cell. Accordingly, the performance and reliability of the fuel cell can be improved.

In the second embodiment of the electrochemical fuel cell, the fuel cell can also be designed so that the base part receives a pressure from the separator and the seal part receives a pressure from the electrolyte membrane and the base part. The high stiffness of the fuel cell stack and high sealing ability can be achieved by this fuel cell.

In the second embodiment of the fuel cell, the above-mentioned seal of the second embodiment of the seal can not only be provided to a seal between an electrolyte membrane and a separator, but can also be provided as a seal which seals a coolant path between the separators.

As the third embodiment of a seal in an electrochemical fuel cell, a seal includes a base part and a seal part. The base part has a first surface, a second surface, a third surface, and a fourth surface. The first surface is opposite to the second surface, and the third surface is opposite to the fourth surface. The distance between the first and second surfaces is greater than the distance between the third and fourth surfaces. The seal part on the third and fourth surfaces extends beyond a plane defined by the first and/or the second surface. Furthermore, the coefficient of elasticity of the base part is higher than the coefficient of elasticity of the seal part.

In this seal, since the seal part has a comparatively soft seal part, by the elastic deformation the seal part can follow the length of the members which sandwiches the seal, though the length changes due to a heat expansion. Accordingly, the higher sealing ability can be attained. Moreover, since the base part has a high resilience against deformation, the stiffness in the pressure direction can be obtained, in the same way as the second embodiment of the seal.

The third embodiment of an electrochemical fuel cell is attained by providing the above-mentioned third embodiment of the seal to the same type fuel cell of the first or second embodiment. By assembling the fuel cell high sealing ability and high stiffness of the fuel cell stack are obtained as the same as the first or second embodiment. Accordingly, the performance and reliability of the fuel cell can be improved.

In the third embodiment of the fuel cell, the above-mentioned seal of the third embodiment of the seal can not only be provided as a seal between an electrolyte membrane and a separator, but can also be provided as a seal which seals a coolant path between the separators.

As the fourth embodiment of a seal in an electrochemical fuel cell, a seal has a first side with a substantially plane surface and a second side with a first sealing member and a second distinct sealing member. The cross-sectional area of the second sealing member is less than the cross-sectional area of the first sealing member. The second sealing member is substantially half elliptical in cross-section. It is also available that a cross-sectional shape of the second sealing member is substantially half circular, trapezoidal or rectangular. It is also available that the second sealing member is substantially extends above the plane defined by the first sealing.

In the fourth embodiment of a seal, since the smaller and extending area of the seal receives a greater stress, it elastically deforms more largely and the seal ability is secured. Since the larger area of the seal receives a lower stress than the smaller area, the elastic deformation of the larger area is smaller and a high stiffness in the direction of the pressure is secured. The high sealing ability and the stiffness is, then, obtained.

The fourth embodiment of an electrochemical fuel cell is achieved by providing the above-mentioned fourth embodiment of the seal as a seal to the same type of the fuel cell as the first, second or third embodiment.

In the fourth embodiment of the fuel cell, the above-mentioned seal of the fourth embodiment of the seal can be adopted to a seal part which seals a coolant path shaped by the separators.

By this fuel cell a high sealing ability and a high stiffness of the fuel cell stack are obtained as the same as the first, second, or third embodiment. Consequently, the performance and reliability of the fuel cell can be achieved.

BRIEF DESCRIPTION OF THE DRAWINGS

The above and other objects, features, advantages and technical and industrial significance of this invention will be better understood by reading the following detailed description of a presently preferred embodiment of the invention, when considered in connection with the accompanying drawing, in which:

FIG. 8 is a magnified cross-sectional view of a modified seal 360a; and

DETAILED DESCRIPTION OF PREFERRED EMBODIMENTS

Figure 1:
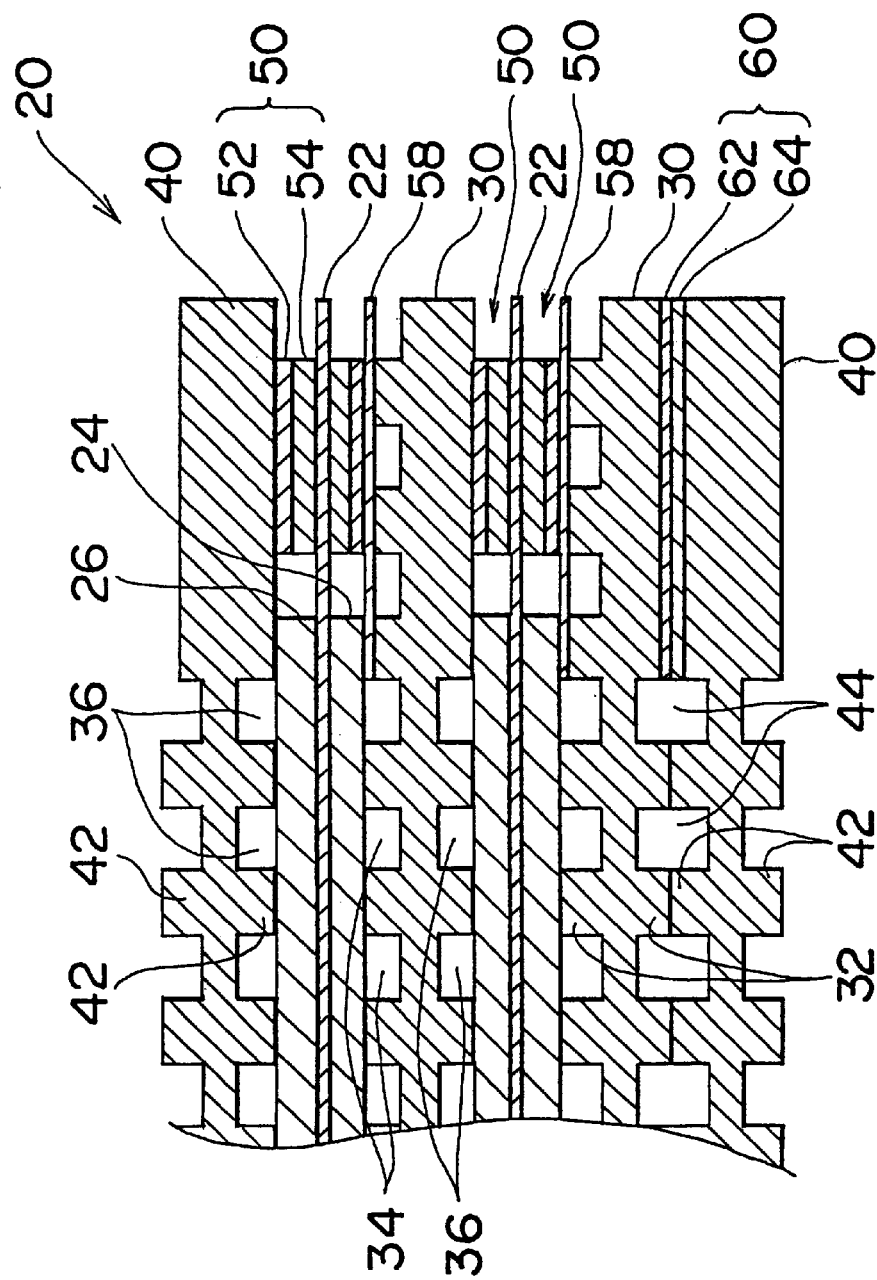
FIG. 1 is a part of a first embodiment of an electrochemical fuel cell stack 20 which provides a first embodiment of a seal 50, shown in a cross-section.

In the following description and the accompanying drawings, the present invention will be described in more detail in terms of specific embodiments. FIG. 1 shows a partial cross-sectional view of a first embodiment of an electrochemical fuel cell including a first embodiment of a seal. For the convenience of explanation, an electrochemical fuel cell stack 20 is first explained, and a seal 50 or a seal 60 which is deposited in the fuel cell stack 20 is later mentioned in details in relation to the fuel cell stack 20.

FIG. 1 shows one unit cell included in the fuel cell stack 20, and the unit cell of the fuel cell stack 20 is made up by laminating an electrolyte membrane 22, two electrodes 24, 26, and a first and second separators 30, 40, and by sealing a path for a fuel gas containing hydrogen, a path for an oxidative gas containing oxygen by the seal 50, and a sealing path for coolant by the seal 60. Incidentally, water can be used as the coolant. The two electrodes which are respectively a fuel electrode 24 and an oxygen electrode 26 sandwich the electrolyte membrane 22. The first and second separators 30, 40 shape a coolant path 44 for the coolant. In order to make the space of the paths for the fuel or oxidative gas, a sealing plate 58 is deposited between the first separator 30 and the seal 50.

The electrolyte membrane 22 is a proton-conductive membrane which is made of solid polymer electrolyte material, for example fluorine resin. The two electrodes 24, 26 are respectively made of carbon-cloths and are kneaded with catalyst on their one side. The catalyst is made of platinum or platinum-alloy. The surface of the fuel electrode 24 which the catalyst is kneaded with faces and touches the electrolyte membrane 22, and in the same way as the fuel electrode 24 the surface of the oxygen electrode 26 which the catalyst is kneaded with faces and touches the electrolyte membrane 22. The electrolyte membrane 22 and the two electrodes 24, 26 sandwiching the electrolyte membrane 22 are united as one body by a hot-press method. It is also available to join them by other methods.

The first and second separators 30, 40 are made of solid and dense carbon which is gas-impermeable. A plurality of projections and depressions are shaped on both surfaces of each separator 30, 40. Here, such a projection is called a rib 32 in the first separator 30 or a rib 42 in the second separator 40. The ribs 32, 42 shape a fuel gas path 34, an oxidative gas path 36, or the coolant path 44.

The seals 50, 60 respectively consist of first layers 52, 62 and second layers 54, 56. The first layers 52, 62 are made of comparatively soft rubber foam. For example, silicon rubber foam or butyl rubber foam, a rubber hardness of which is equal to or lower than 60 degrees, is used for material of the first layers 52, 62. The second layers 54, 64 are made of harder rubber than the rubber which is provided to the first layers 52, 62. For instance, silicon rubber or butyl rubber which rubber hardness is equal to or higher than 60 degrees. It means that coefficients of elasticity of the rubber of the second layers 54, 64 are greater than those of the first layers 52, 62.

Next, how to assemble the fuel cell stack 20, mainly how to assemble the seal 50 is explained. The second layer 54 is positioned at a place where sealing is necessary on the each surface of the electrolyte membrane 22, after the electrolyte membrane 22 is connected by the two electrodes 24, 26. The second layers 54 and the electrolyte membrane 22 are united as one body. Places where sealing is necessary are, for example, a periphery of the electrolyte membrane 22, the periphery of the fuel gas path 34, or the oxidative gas 36 shaped in the direction of the laminating cells in the fuel cell stack 20. A hot-press method or a method of using adhesives is available for uniting the second layer 54 and the electrolyte membrane 22. Next, the first layer 52 is set on the second layer 54, and furthermore the sealing plate 58 and the first or second separator 30, 40 are put thereon.

When the coolant path 44 is shaped by setting the first and second separators 30 and 40 on together, the second layer 64 is positioned at a place where sealing is necessary on the first separator 30 or the second separator 40. Subsequently, the second layer 64 and the second separator 40 are united as one body. In the same way as the seal 50 is assembled, the first layer 62 is positioned on the second layer 64, and the first separator 30 is put thereon.

The first layer 52 is put on after the second layer 54 connected to the electrolyte membrane 22 or the second separator 40 as mentioned above, to increase the sealing ability by absorbing the surface roughness of the first or second separator 30, 40 by the first layer 52 with its lower rubber hardness, because the surface roughness might cause to decrease the sealing ability. Another purpose is for the first layer 52 to elastically respond and follow the length of the electrolyte membrane 22 changed by the varying temperature. Furthermore, the second layer 54, having the higher rubber hardness, is used to increase the stiffness of the fuel cell stack 20 in the direction of the lamination of each unit cell. By providing the seal 50 or 60 including two layers with different coefficients of elasticity, the softer layer (that is, the second layer 52 or 62) absorbs surface roughness of a sealing member and responds to the changing length of the electrolyte membrane 22 or the separator 30, 40, and the harder layer (that is, the second layer 54 or 64) restrains an elastic deformation of the fuel cell stack 20, and the higher stiffness of the fuel cell stack 20 is obtained.

The fuel cell stack 20 which is assembled and made up as mentioned above is pressed by a predetermined pressure in the direction of lamination of a plurality of the unit cells. The pressure reduces a contacting electric resistance between the electrode 24 or 26 and separator 30 or 40 and increases sealing ability of the seal 50 or 60 by increasing the pressure on the surface of the seal 50 or 60.

As mentioned above, because the fuel cell stack 20 of the first embodiment has the seal 50 including two layers with different coefficients of elasticity, the surface roughness of the first separator 30 or the second separator 40 which might decrease the sealing ability can be absorbed, and the changing length of the electrolyte membrane 22 or etc. caused by changing temperature can be followed. The high sealing performance, thus, can be achieved. Moreover, because the seals 50, 60 provide the harder layers (the second layers 54, 64), the high stiffness of the fuel cell stack 20 in the laminating direction of the unit cells is attained. The total performance of the fuel cell 20 is improved by these advantages of the seals 50, 60.

Incidentally, the seal 50 is not only limited to consist of two layers with different coefficients of elasticity as mentioned above, but it can also consist of three or more layers. Furthermore, a seal which material's coefficient of elasticity consecutively changes from one surface to another surface of the seal is also available. In the seal consisting of three or more layers, it is not only available that the softer layer is set to contact the separator 30, 40, etc., but it is also available that the softer layer is not set to contact them. For instance, the softer layer is inserted between two harder layers. When this type of fuel cell stack is assembled, the softer layer is positioned and connected, after uniting the electrolyte membrane 22 with one harder layer and uniting the separators 30, 40 with another harder layer.

The seal 50 of the first embodiment consists of the first layer 52 and the second layer 54, each of which is a completely laminated layer. It is also available that the harder layer 52 includes material of a softer layer. From the view point of absorbing the surface roughness of the separator or etc., though it is desirable that the softer layer is a completely laminated layer, it is not necessary that the harder layer is a completely laminated layer. Furthermore, it is not necessary that the softer layer is a completely laminated layer, and it is no problem that one part of the softer layer is material of further softer, or that small part of the softer layer is made of harder material.

Figure 2:
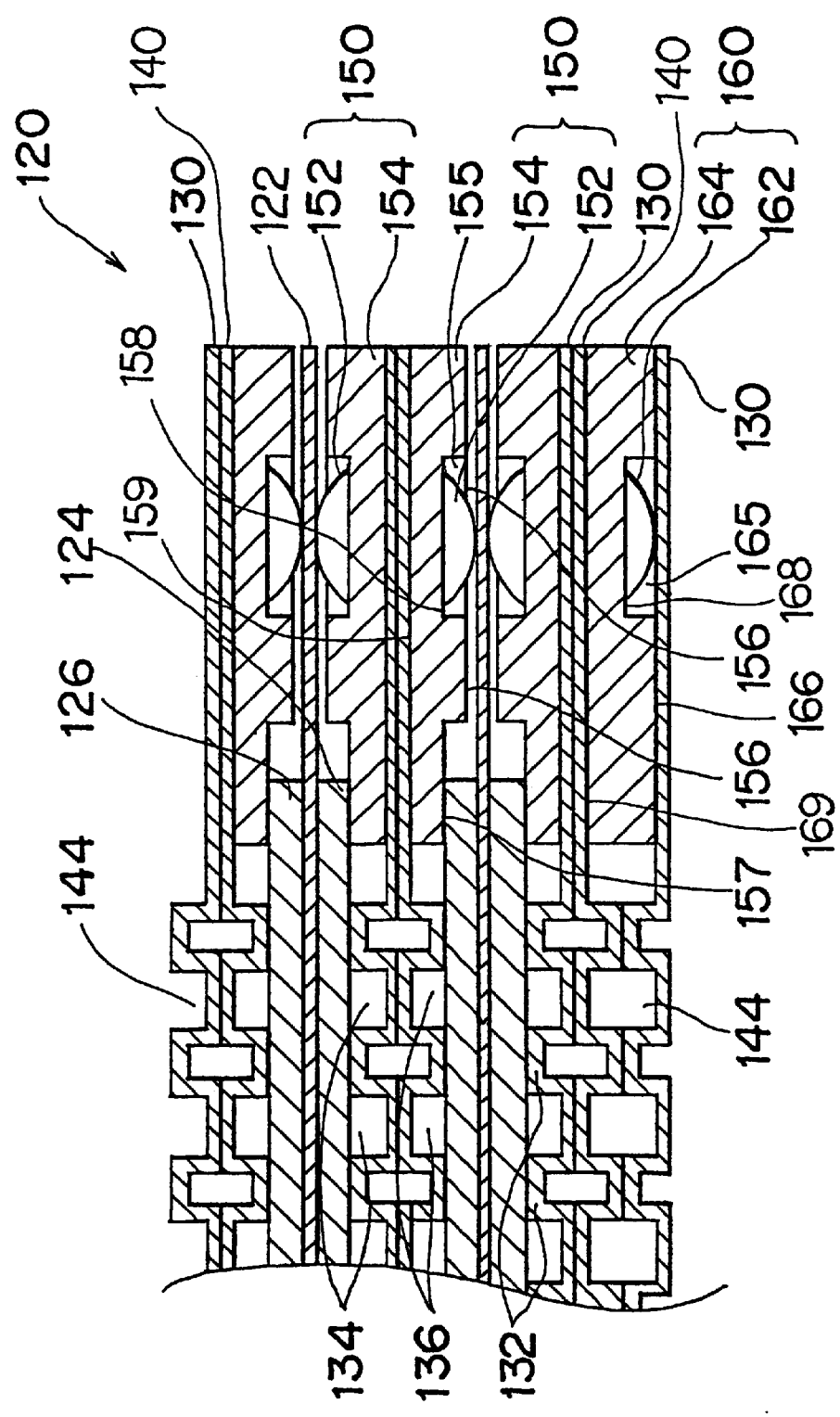
FIG. 2 is a part of a second embodiment of an electrochemical fuel cell stack 120 which includes a second embodiment of a seal 150, shown in a cross-section.

Next, the second embodiments of the seal and the fuel cell are explained using a seal 150 and a fuel cell stack 120 including the seal 150 in FIG. 2. FIG. 2 is a partial cross-sectional view of the fuel cell stack 120 including the seal 150.

As the same as the fuel cell stack 20 of the first embodiment, the fuel cell stack 120 includes an electrolyte membrane 122, a fuel electrode 124, an oxygen electrode 126, a first separator 130, a second separator 140, and seals 150, 160. The electrolyte membrane 122, and the two electrodes 124, 126 are respectively the same as the above-mentioned electrolyte membrane 22, and electrodes 24, 26. The separators 130, 140 are walls for one unit cell, and by sandwiching the electrode 124 or 126, the first or second separator 130, 140 and the electrolyte membrane 122 shapes a fuel gas path 134 or an oxidative gas path 136. In the same way, the first and second separators 130, 140 shape a coolant path 144. The seal 150 seals the fuel gas path 134 or the oxidative gas path 136, and the seal 160 seals the coolant gas path 144. The explanation of the same parts in this second embodiments as in the first embodiments are, here, omitted.

The separator 130 is made of a metal such as aluminum, stainless steel, nickel alloy, or etc. A plurality of projections and depressions are shaped on the separator 130, and the projections are called ribs 132. The ribs 132 constitute paths 134 for the fuel gas or paths 136 for the oxidative gas, and the ribs 132 constitutes paths 144 for coolant. On the surface of the separator 130 facing the path 134 or 136, high electric conductive seat (ex. resin seat permeated with carbon) is connected by press in order to prevent the surface of the separator 130 from rusting (not shown in FIG. 2). In the second embodiment, as shown in FIG. 2, the first and second separators 130, 140 are put on together contacting each surface with plane symmetry. Soft metal with high electrical conductivity (ex. tin, nickel, or etc.) is stuck to the contacting surfaces of the first and second separators 130, 140 to reduce electrical resistance between the mating surfaces of the first and second separators 130, 140.

The seals 150, 160 respectively consist of the seal parts 152, 162 made of comparatively soft (i.e. lower coefficient of elasticity) rubber foam (ex. silicon rubber, butyl rubber, etc. with rubber hardness 60 or less degrees) and the base parts 154, 164, made of comparatively hard (i.e. higher coefficient of elasticity) rubber (ex. silicon rubber, butyl rubber, etc. with rubber hardness 60 or more degrees). It is available that the seal parts 152, 162 have shapes half elliptical in cross-section.

A first surface 159 is opposite and parallel to a second surface 156 and a third surface 158. The third surface 158 is closer to the first surface 159 than the second surface 156. A seal groove 155, then, is shaped in the base part 154. The seal part 152 is deposited in the seal groove 155. A part between the second surface 156 and the first surface 159 in the base part 154 secures the stiffness in the laminated direction against excess pressure, and an extending member 157 is also provided in the base part 154 for supporting the electrolyte 124 or 126. The depth of the seal groove 155 is a little bit less than the thickness of the seal part 152.

In the same way as the seal groove 155, a seal groove 165 is shaped in the surface of the base part 154 by shaping a third surface 168. However, the same extending member as the extending member 157 is not provided, because it is not necessary to support the electrode 124 or 126. The depth of the seal groove 165 is substantially the same as the thickness of the seal part 162 on the condition pressed by a predetermined pressure.

First, the base parts 154, 164 are closely contacted at a predetermined position of the separators 130, 140 by adhesives or a like, and the seal parts 152, 162 are set in the seal grooves 155, 165 on the base parts 154, 164. After laminating a plurality of the separators 130, 140 and a plurality of the electrolyte membranes 122 connected by the sets of the two electrodes 124, 126, a predetermined pressure is applied to the assembled fuel cell stack 120.

When the predetermined pressure is applied, the seal part 152 or 162 is elastically deformed and the electrolyte membrane 122 and the base part 154 or 164 is closely contacted. Accordingly, the contacting members are sealed with high reliability, and the seal part 152 or 162 follows and responds to the changing length of the electrolyte membrane 122 subjective to its changing temperature, owing to the elastic deformation. Furthermore, when the predetermined pressure is applied to in the lamination direction of the fuel cell stack 120, the harder base part 154, having a coefficient of elasticity greater than the coefficient of the seal part 152, contacts the electrolyte membrane 122. Consequently, the stiffness of the fuel cell stack 120 in the lamination direction is obtained, because the base part 154 receives the pressure.

As mentioned above, since the seals 150, 160 respectively consist of the comparatively soft seal parts 152, 162 and the comparatively hard seal parts 154, 164 in the fuel cell stack 120 of the second embodiment, the high sealing ability is secured and the seals 150, 160 can respond to the changing length of the electrolyte membrane 122 or etc. caused by the varying temperature. Moreover, the high stiffness of the fuel cell stack 120 in the lamination direction is obtained. Therefore, the total performance of the fuel cell can be improved by the above-mentioned advantages, owing to the seals 150, 160.

Figure 3:
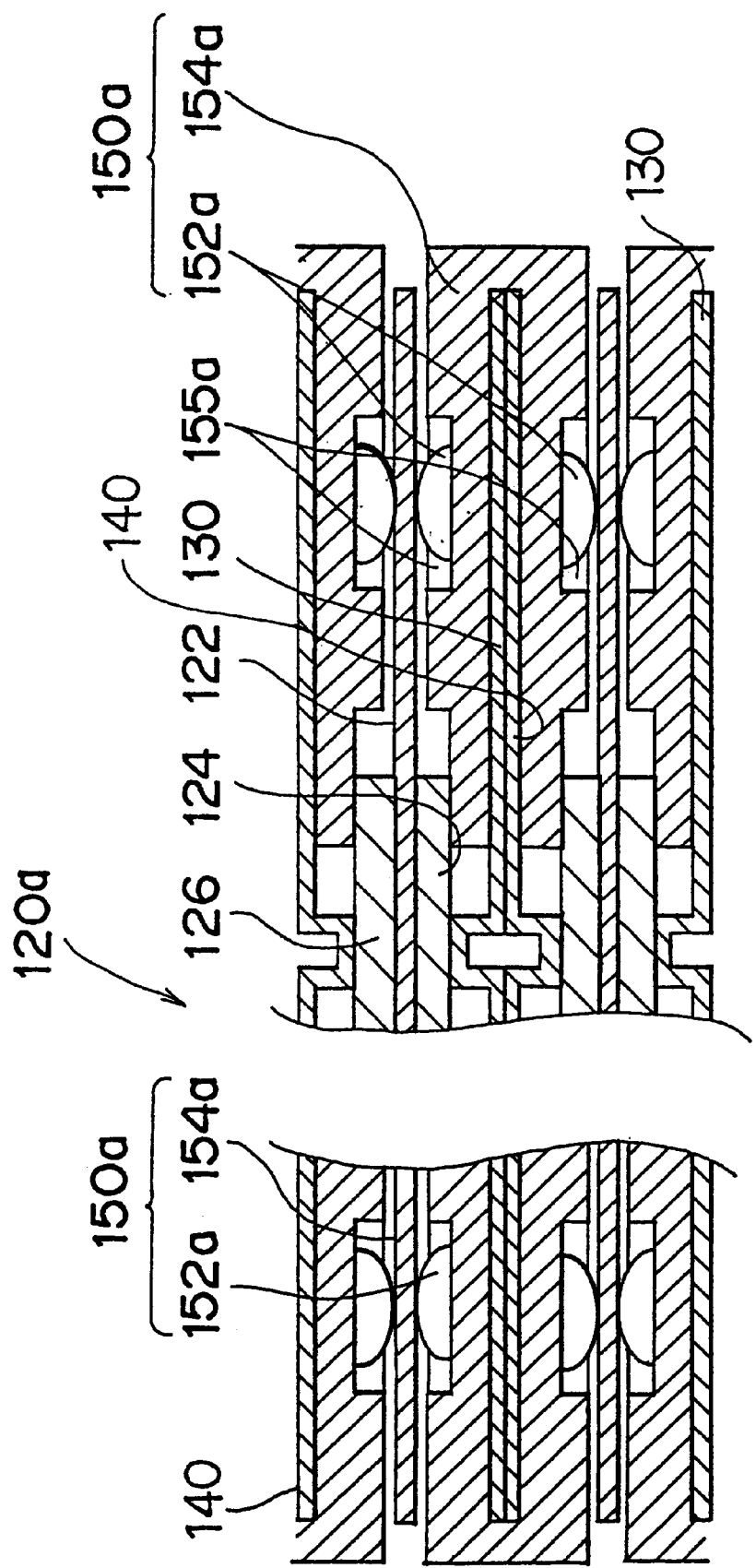
FIG. 3 shows an electrochemical fuel cell stack 120a in a cross-section, as a modified example of the second embodiment.

In the fuel cell stack 120, the seals 150, 160 consist of the seals 152, 162 and the base parts 154, 164. It is, however, also available that a seal 150a consists of one base part 154a and two seal parts 152a in the modified embodiment (a fuel cell stack 120a) as illustrated in FIG. 3. In this fuel cell stack 120a, the base part 154a, which is plane symmetry and wraps the end part of the two separators 130, 140, is put together closely, and two seal grooves 155a are shaped on the opposite members of the base part 154a. The two seal parts 152a are respectively deposited in two seal grooves 155a. Since the end part of the separators 130, 140 is covered as shown in FIG. 3, the separators 130, 140 can be prevented from rusting.

Figure 4:
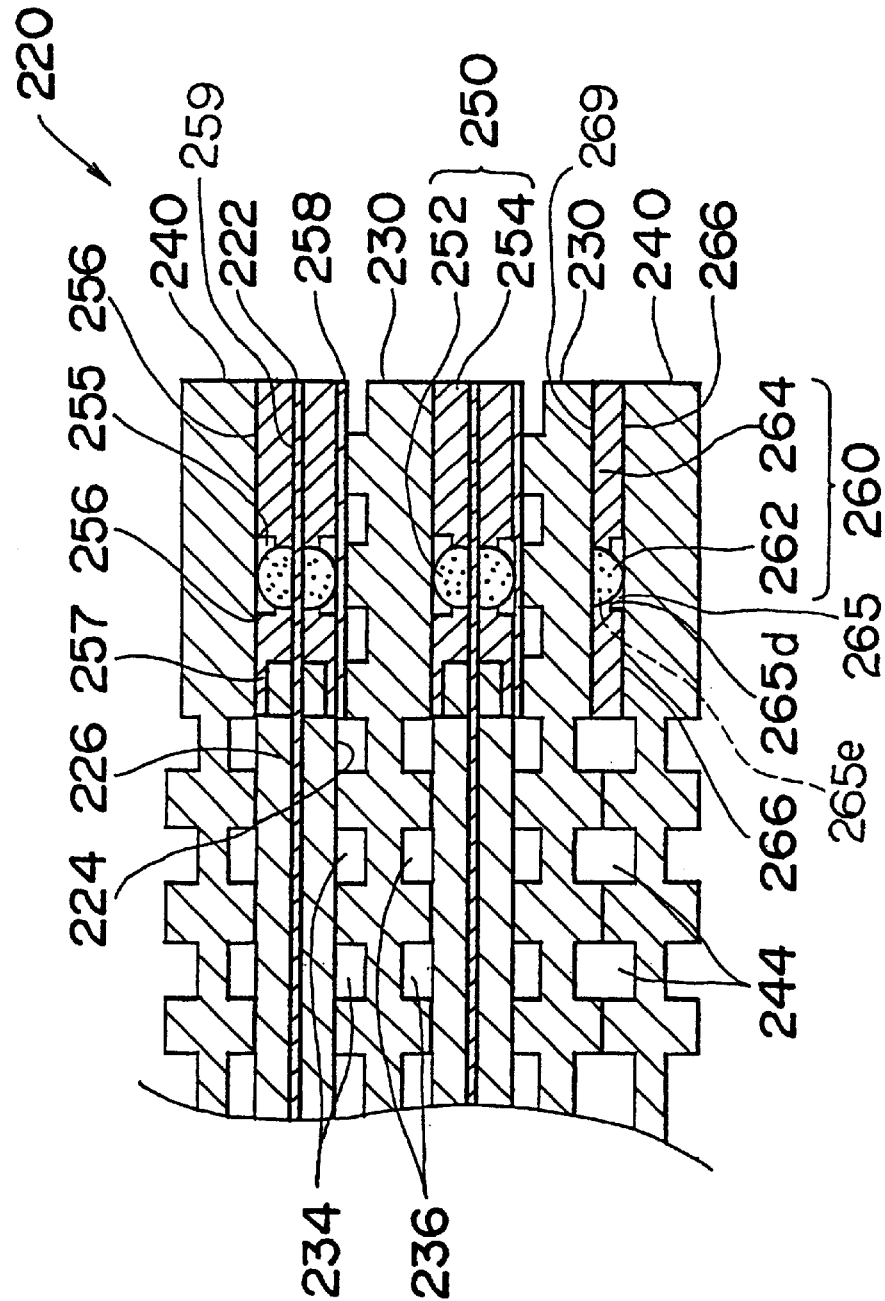
FIG. 4 is a part of a third embodiment of an electrochemical fuel cell stack 220 which provides a third embodiment of a seal 250, shown in a cross-section.

Next, seals 250, 260 and a fuel cell stack 220 including the seals 250, 260 are explained, as the third embodiment of the present invention. FIG. 4 is a partial cross-sectional view of the fuel cell stack 220 having the seals 250, 260.

The fuel cell stack 220 of the third embodiment has the same structure as the fuel cell stack 20 of the first embodiment, except the seals 250 and 260. The explanation of the same parts as the fuel cell stack 20 is, then, omitted in this fuel cell stack 220. Incidentally, the appended number of each part of the fuel cell stack 220 is added by 100 to the number of the respective part of the fuel cell stack 20.

The seals 250, 260 respectively consist of seal parts 252, 262 and base parts 254, 264. The seal parts 252, 262 are made of the same material as the seal parts 152, 162 shown in the second embodiment, and the base parts 254, 264 are made of the same material as the base parts 154, 164, shown in the second embodiment. The base part 254 including an extending part 257 has a first surface 256 and a second surface 259. The extending part 257 supports an electrodes 224, 226. The base part 254 also has a seal hole 255 in which the seal 152 is provided.

Figure 5:
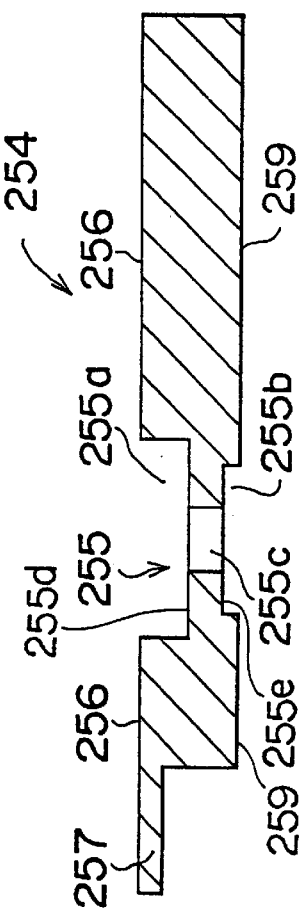
FIG. 5 is a magnified cross-sectional view of a base part 254 in the third embodiment of the seal.

With reference to FIG. 5, the seal hole 255 comprises a first seal space 255a facing a first separator 230 or a second separator 240, a second seal space 255b facing the electrolyte membrane 222, and a bottom hole 255c. A distance between a third surface 255d which is the bottom of the first seal space 255a and a fourth surface 255e which is also the bottom of the second seal space 255b is shorter than the distance between the first and second surfaces 256, 259. A plurality of the bottom holes 255c are regularly located. and connect between the seal spaces 255a and 255b. In the same way as the base part 254, a seal hole 265 is provided in the base part 264, and as illustrated in FIG. 4 a first surface 266 and a second surface 269 are deposited. However, since it is not necessary to support the electrodes 224, 226, the same part as the extending part 257 is not shaped in the base part 264. The distance between the first surface 256 and the second surface 259 is substantially the same as the thickness of the seal part 252 which is pressed by a predetermined pressure. In the same way, the distance between the first surface 266 and the second surface 269 is substantially the same as the thickness of the seal part 262 which is pressed by a predetermined pressure. Accordingly, the first and second surfaces 256 (or 266) and 259 (or 269) receive most of the pressure, when an excessive pressure higher than the predetermined value is applied to the seal 250 (or 260). Because the base parts 254, 264 are made of comparatively high coefficient of elasticity material, the fuel cell stack 220 can have a higher stiffness in the laminating direction.

In order to assemble the fuel cell stack 220, first the base part 254 is closely connected to a predetermined place in a first separator 230 or a second separator 240 by adhesives or etc. Next, the seal part 252 is inserted into the seal hole 255 in the base part 254, and the two separators 230, 240 with seals 250 and two electrodes 224, 225 connected to the electrolyte membrane 222 are put together as a unit cell. A plurality of such unit cells are stacked and assembled to the fuel cell stack 220. A sealing material is inserted by a pressure to the seal spaces 255a and 255b, so that the seal 250 is sufficiently and closely connected to the separators 230, 240 or the electrolyte membrane 222. The sealing material is inserted to the first seal space 255a continuously from the second seal space 255b through the bottom hole 255c. Since how to assemble the first and second separators 230, 240 to shape a coolant path 244 by inserting the seal 260 is the same way as how to insert the seal 250 as mentioned above. Here, the explanation is, then, omitted. After assembling the unit cells, a predetermined pressure is applied in the lamination direction of the units cells, and the fuel cell stack 220 is finally completed.

The seal parts 252 and 262 is given the predetermined pressure and closely connected to the separators 230, 240 and electrolyte membrane 222. Consequently, the seals 250, 260 seal between the surfaces with high reliability, and respond and follow due to the elastic deformation to the changing length of the electrolyte membrane 222 effected by the varying temperature.

In the aforementioned fuel cell stack 220, by providing the seals 250, 260 which comprise the seal parts 252, 262 having lower coefficients of elasticity and the base parts 254, 264 having higher coefficients of elasticity, the high sealing ability is not only obtained, but the seals 250, 260 also respond to and follow the changing length of the electrolyte membrane 222 or etc. by the effect of the changing temperature. Furthermore, the high stiffness of the fuel cell stack is secured in the lamination direction. Due to these advantages of the seals 250, 260, the total performance of the fuel cell can be improved.

In the fuel cell stack 220, the bottom hole 255c is shaped, however, it is also available that there is not a bottom hole between the third and fourth surfaces 255d, 255e. In this case, it is necessary that the seal part 252 is inserted to both seal spaces 255a, 255b separately.

In the fuel cell stack 220, the seal holes 255, 265 are shaped in the base parts 254, 264 and the seal part 252, 262 are inserted into the seal holes 255, 265. Moreover, it is also available that a base part and a seal part are located in parallel and respectively they receive a pressure by a separator and an electrolyte membrane or by two separators. In this case, if the seal part is located in an inner side of the base part (that is, near the electrode in FIG. 4), the higher sealing ability is obtained.

Figure 6:
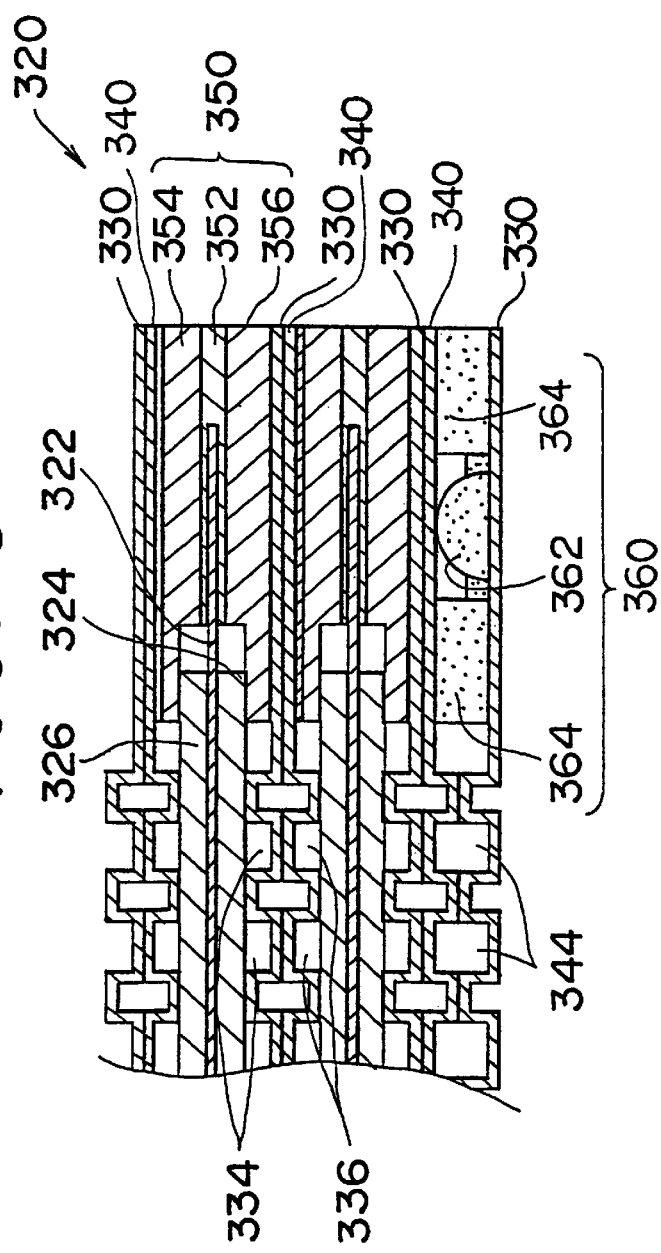
FIG. 6 is a part of a fourth embodiment of an electrochemical fuel cell stack 320 which includes a fourth embodiment of a seal 360, shown in a cross-section.

Next, as the fourth embodiment, seals 350, 360 and a fuel cell stack 320 including the seals 350, 360 is explained. FIG. 6 is a partial cross-sectional view of the fuel cell stack 320 including the seals 350, 360.

Concerning the fuel cell stack 320 as the fourth embodiment, it has the same structure as the fuel cell stack 120 (the second embodiment). Here, it is, then, omitted to explain the same parts in the fuel cell stack 320 as the parts in the fuel cell stack 120. Incidentally, appended numbers of parts of the fuel cell stack 320 are shown by adding 200 to parts numbers of fuel cell stack 120.

A seal 350 deposited in the fuel cell stack 320 consists of layers 354 and 356 having the same material as the base part 154 of the second embodiment, and a sealing layer 352 made of rubber adhesives (ex. adhesives by combining silicon and epoxy resin). A coefficient of elasticity of the sealing layer 352 is lower than coefficients of elasticity of the layers 354 and 356 after the fuel cell stack 320 is stacked. The seal 350 consists a sealing layer 352 having a comparatively low coefficient of elasticity and the layers 354, 356 having a higher coefficient of elasticity than the sealing layer 352. Consequently, the seal 350 can be considered to be a modified embodiment, though the arranging of the soft and hard layers is different from the seal 50 of the first embodiment. The same advantages as mentioned in the first embodiment can be obtained.

A seal 360 consists of a comparatively hard rubber (that is, comparatively high coefficient elasticity), for example silicon rubber or butyl rubber which rubber hardness is equal to 60 degrees or more. A first side of the seal 360 has a substantially plane surface 366 and a second side of the seal 360 has a first sealing member 364 and a second distinct sealing member 362. The cross-sectional area of the second sealing member 362 is less than the cross-sectional area of the first sealing member 364, and the second sealing member 362 is substantially half elliptical in cross-section. The plane surface 366 and the first sealing member 364 receives a pressure and contributes to a high stiffness of the fuel cell stack 320 in the stacked direction of the unit cells. As illustrated by a magnified cross-sectional view in FIG. 7, the second sealing member 362 extends by Δh above the plane defined by the first sealing member 364. Here, the extending value Δh is determined by considering the changed value by elastic deformation of the seal 360, and considering an applied pressure to the seal 360, material of the seal 360, the shape of the second sealing member 362, etc. When a predetermined pressure is applied, the second sealing member 362 seals with high reliability. Since the plane surface 366 and the first sealing member 364 receives most of the extra pressure, when more than the predetermined pressure is applied, the high stiffness of the fuel cell stack is secured in the lamination direction.

In the fuel cell stack 320 of the fourth embodiment, by providing a seal including a sealing member extending above another member, and a plane surface and the sealing member having a smaller area than another sealing member, a high sealing ability is not only secured, but a high stiffness of the fuel cell stack 320 is also obtained in the stacked direction.

Figure 7:
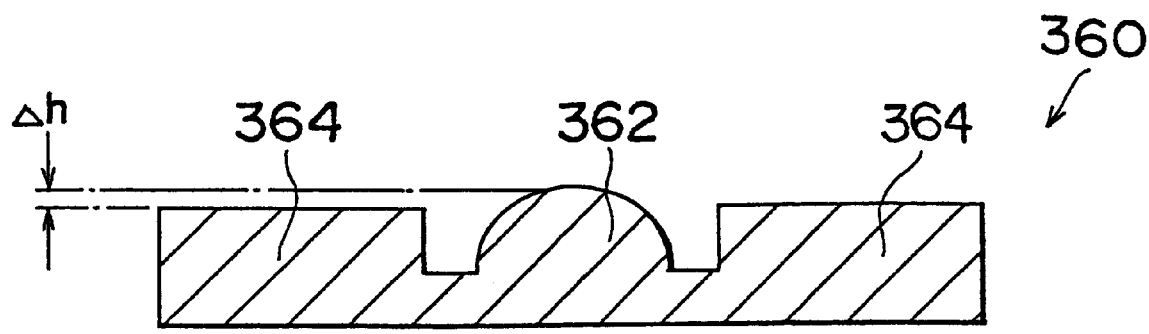
FIG. 7 is a magnified cross-sectional view of a seal 360 of the fourth embodiment of the seal.
Figure 8:
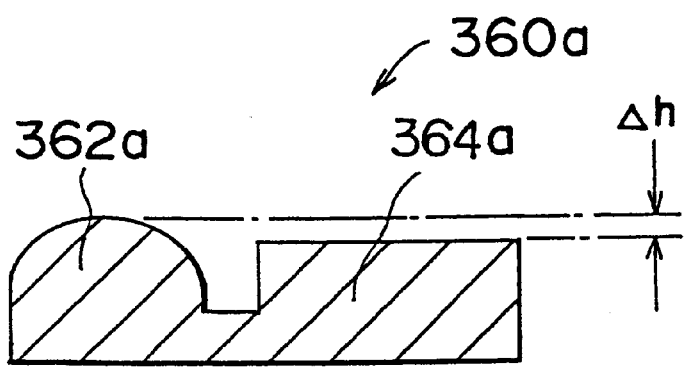

In the seal 320, the first sealing member 364 is divided to two parts as shown in FIG. 7, however a first sealing member 364a which is not divided is also available as illustrated in FIG. 8.

Figure 9:
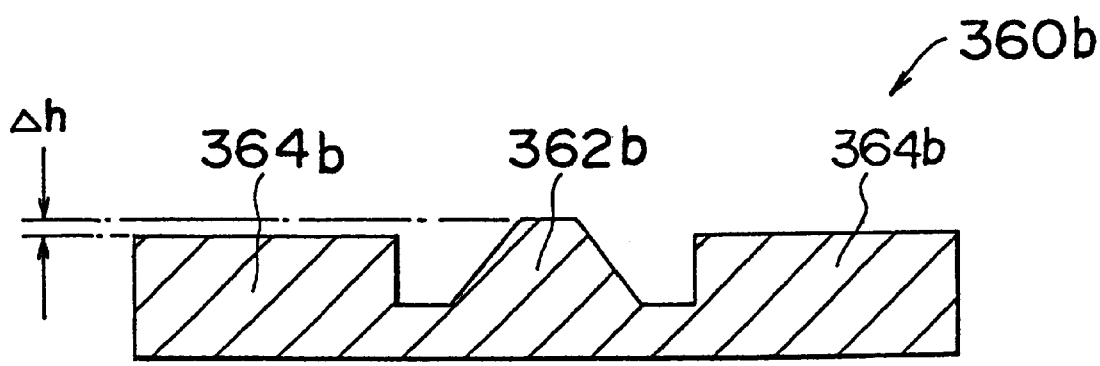
FIG. 9 is a magnified cross-sectional view of a modified seal 360b.

Furthermore, concerning a shape of the seal 360, the shape of the second sealing member 362 is half elliptical in the cross-sectional view. Another shape of the second sealing member 362 is, however, also available, for example, half circular. One example of the seal 360b having the second sealing member 362b of trapezoidal shape is shown in FIG. 9. A rectangular shape is also available for the shape of the second sealing member.

Incidentally, in the seal 360 the second sealing member 362 extends above the first sealing member 364, however it is also available that the second member 362 does not extend above the first sealing member 364, that is, both members are on the same one plane. In this case advantages are restrained, but it is still effective.

In the fuel cell stack 320, the seal 360 is provided between the separators 330 for shaping the coolant path 344, however instead of the sealing layer 352 and the layers 354, 356, this type of the seal 320 can also be provided between separators 330 for sandwiching the electrolyte membrane 322 and the electrode 324 or 326.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A seal for stacks of polymer electrolyte fuel cells and for preventing fluid in a space of said fuel cells from leaking, said seal comprising a first layer placed in a laminar arrangement with a second layer, wherein the first layer has a first coefficient of elasticity and elastically absorbs changes in length, in a laminated direction, of a member, which contacts said second layer, and wherein said second layer, has a second coefficient of elasticity and elastically ensures stiffness in the direction in which said first and second layers are stacked, and wherein the second coefficient of elasticity is higher than the first coefficient of elasticity.

2. A seal for stacks of polymer electrolyte fuel cells and for preventing fluid in a space of said fuel cells from leaking, said seal comprising a first layer and a second layer, said second layer having a higher coefficient of elasticity than a coefficient of elasticity of said first layer, said seal further comprising a third layer, said first, second, and third layers being arranged with respect to each other in order of decreasing coefficient of elasticity, wherein said first, second and third layers are placed in a laminar arrangement.

3. The seal according to claim 2, wherein said layers are made of rubber.

4. The seal according to claim 3, wherein with respect to two of said first, second and third layers having different coefficients of elasticity, a rubber hardness of a first of said two layers having a higher coefficient of elasticity is equal to or higher than 60 degrees and a rubber hardness of a second of said two layers having a lower coefficient of elasticity layer is equal to or lower than 60 degrees.

5. A seal in an electrochemical fuel cell for preventing fluid in a space from leaking, said seal comprising a first side and a second side placed in a laminar arrangement wherein a coefficient of elasticity consecutively increases from the first side of said seal to the second side of said seal, where
   a) the first coefficient of elasticity of the first side of said seal is enough to elastically absorb changes in dimension of a member that contacts a second layer, and
   b) the second coefficient of elasticity of the second side of said seal is enough to elastically ensure stiffness in the direction in which said first side of said seal and said second layer is stacked.

6. The seal according to claim 1, wherein the member is selected from the group consisting of an electrolyte membrane and a separator.

7. The seal according to claim 1, wherein the seal is placed between an electrolyte membrane and a separator or between two separators that form a coolant path.

8. A seal for stacks of polymer electrolyte fuel cells and for preventing fluid provided in a space of said fuel cells from leaking, said seal comprising:
   a base part, having a first coefficient of elasticity, that elastically ensures stiffness in the direction in which the base part and a seal part are stacked, having a first surface, a second surface, and a third surface, the second and third surfaces being opposite to the first surface, the third surface being closer to the first surface than the second surface; and
   said seal part, having a second coefficient of elasticity, elastically absorbs changes in length, in a laminated direction, of a member, that contacts the base part, is on the third surface of the base part and extends beyond a plane defined by the second surface of the base part, wherein the first coefficient of elasticity is higher than the second coefficient of elasticity,
   wherein said base part and said seal part are placed in a laminar arrangement.

9. A seal for stacks of polymer electrolyte fuel cells and for preventing fluid provided in a space of said fuel cells from leaking, said seal comprising:
   a base part having a first surface, a second surface, and a third surface, the second and third surfaces being opposite to the first surface, the third surface being closer to the first surface than the second surface; and
   a seal part on the third surface of the base part and extending beyond a plane defined by the second surface of the base part, wherein a coefficient of elasticity of the base part is higher than the coefficient of elasticity of the seal part, and
   wherein said base part and said seal part are placed in a laminar arrangement and said base part and said seal part are made of rubber.

10. The seal according to claim 9, wherein a first rubber hardness of said base part is equal to or higher than 60 degrees and a second rubber hardness of said seal part is equal to or lower than 60 degrees.

11. A seal for stacks of polymer electrolyte fuel cells and for preventing fluid in a space of said fuel cells from leaking, said seal comprising:

a base part, having a first coefficient of elasticity, that elastically ensures stiffness in the direction in which the base part and a seal part are stacked, having a first surface, a second surface, a third surface, and a fourth surface, the first surface being opposite to the second surface, the third surface being opposite to the fourth surface, and the distance between the first and second surfaces being greater than the distance between the third and forth surfaces; and said seal part, having a second coefficient of elasticity, elastically absorbs changes in length, in a laminated direction, of a member, that contacts the base part, is on the third and fourth surfaces and extends beyond a plane defined by the first surface and/or the second surface, wherein a coefficient of elasticity of the base part is higher than the coefficient of elasticity of the seal part, wherein said base part and said seal part are placed in a laminar arrangement.

\* \* \* \* \*